United States Patent
Shin et al.

(10) Patent No.: US 9,422,846 B2
(45) Date of Patent: Aug. 23, 2016

(54) SCRUBBER SYSTEM HAVING AN APPARATUS FOR CREATING AUTOMATIC AN OXIDIZING BENT AND ABSORBENT

(71) Applicant: Techwin Co., Ltd., Cheongju, Chungcheongbuk-Do (KR)

(72) Inventors: Hyun Su Shin, Daejeon (KR); Jung Sik Kim, Chungcheongbuk-Do (KR); Boong Ik Jung, Chungcheongbuk-Do (KR)

(73) Assignee: Techwin Co., Ltd., Cheongju, Chungcheongbuk-do (KR)

( * ) Notice: Subject to any disclaimer, the term of this patent is extended or adjusted under 35 U.S.C. 154(b) by 142 days.

(21) Appl. No.: 14/182,848

(22) Filed: Feb. 18, 2014

(65) Prior Publication Data

US 2014/0161678 A1    Jun. 12, 2014

Related U.S. Application Data

(63) Continuation of application No. PCT/KR2012/006662, filed on Aug. 22, 2012.

(30) Foreign Application Priority Data

Aug. 23, 2011   (KR) .................. 10-2011-0083969

(51) Int. Cl.
*F01N 3/08* (2006.01)
*B01D 53/14* (2006.01)
(Continued)

(52) U.S. Cl.
CPC .............. *F01N 3/0807* (2013.01); *B01D 53/78* (2013.01); *C02F 1/4618* (2013.01);
(Continued)

(58) Field of Classification Search
CPC ................ B01D 2251/108; B01D 2252/1035; B01D 2257/404; B01D 53/78; C02F 1/4618; C02F 1/4674; C02F 2001/46195; C02F 2103/02; C02F 2103/08; C02F 2103/18; F01N 3/0807; H04L 61/6009; H04L 61/6013; H04L 61/6059; H04L 65/1069; H04L 67/02; H04L 67/1027; H04L 67/42; H04L 69/161; H04L 69/22
See application file for complete search history.

(56) References Cited

U.S. PATENT DOCUMENTS

2005/0269254 A1*  12/2005  Roitman .............. B01D 5/0072
                                                              210/252
2013/0228459 A1*   9/2013  Hanaoka ............. C02F 1/46104
                                                              204/257

FOREIGN PATENT DOCUMENTS

| JP | 2000-271429 A | 10/2000 |
| JP | 2002-094129 A | 3/2002 |
| JP | 2002-281852 A | 10/2002 |
| JP | 2003284919 A * | 10/2003 |

(Continued)

OTHER PUBLICATIONS

Machine translation of JP 2003284919; accessed Sep. 25, 2015.*

*Primary Examiner* — Duane Smith
*Assistant Examiner* — Cabrena Holecek
(74) *Attorney, Agent, or Firm* — Mintz Levin Cohn Ferris Glovsky and Popeo, P.C.; Kongsik Kim; Colleen H. Witherell

(57) ABSTRACT

The present invention relates to a scrubber system having an automatic generator for an oxidizing-absorbing agent. The scrubber system comprises a scrubber and an oxidizing-absorbing agent generator. The scrubber includes a pollutant gas inlet through which air pollutants are introduced, a treated gas outlet through which the pollutant gas which has been treated is discharged, and a treated water outlet through which wastewater which has been used to treat the pollutant gas is discharged. The oxidizing-absorbing agent generator generates an oxidizing-absorbing agent by electrolyzing saline water or seawater in the scrubber, and supplies the generated oxidizing-absorbing agent into the scrubber to treat the pollutant gas introduced through the pollution gas inlet, thereby removing harmful substances.

6 Claims, 3 Drawing Sheets

(51) Int. Cl.
  B01D 53/78 (2006.01)
  C02F 1/461 (2006.01)
  C02F 1/467 (2006.01)
  C02F 103/02 (2006.01)
  C02F 103/08 (2006.01)
  C02F 103/18 (2006.01)
(52) U.S. Cl.
  CPC .. *B01D 2251/108* (2013.01); *B01D 2252/1035* (2013.01); *B01D 2257/404* (2013.01); *C02F 1/4674* (2013.01); *C02F 2001/46195* (2013.01); *C02F 2103/02* (2013.01); *C02F 2103/08* (2013.01); *C02F 2103/18* (2013.01)

(56) References Cited

FOREIGN PATENT DOCUMENTS

| JP | 2008-030979 A | 2/2008 | |
|----|---------------|--------|--|
| JP | 4751994 B1 * | 8/2011 | .......... C02F 1/46104 |
| KR | 20-0178265 Y1 | 4/2000 | |

* cited by examiner

SCRUBBER SYSTEM HAVING AN APPARATUS FOR CREATING AUTOMATIC AN OXIDIZING BENT AND ABSORBENT

CROSS-REFERENCE TO RELATED APPLICATIONS

This application is a continuation of International Application No. PCT/KR2012/006662 filed on Aug. 22, 2012, which claims priority to Korean Application No. 10-2011-0083969 field on Aug. 23, 2011, which applications are incorporated herein by reference.

TECHNICAL FIELD

The present invention relates to a scrubber system for preparing an oxidizing-absorbing agent for treating various air pollutants using electrolysis.

BACKGROUND ART

Recently, with the development of industries, various air pollutants, such as combustion gases generated by the burning of fossil fuel, harmful gases discharged from various chemical processes, waste gases generated from waste-water treatment processes, etc., have increased.

Among processes for treating air pollutants, there is a typical process of absorbing or oxidizing air pollutants using a wet scrubber. Korean Patent Application Publication No. 10-2010-0106267 (immersion type scrubber control method) discloses a method of treating various air pollutants using a wet scrubber.

The disclosed conventional technology is configured such that foreign materials included in exhaust are precipitated by spraying a liquid through a nozzle provided in a scrubber. However, this technology has a limitation in treating air pollutants using a physical method.

In order to overcome such a limitation, technologies for treating air pollutants by increasing the absorption or oxidation efficiency of air pollutants in a wet scrubber using an oxidizing agent such as NaOCl, NaClO2 or the like or a chemical such as NaOH or the like have recently been researched and developed.

SUMMARY

Accordingly, the present invention has been devised to solve the above-mentioned problems, and an object of the present invention is to provide a scrubber system having an automatic oxidizing-absorbing agent generator, wherein various air pollutants can be oxidized and absorbed using an oxidizing agent generated by the electrolysis of saline water or sea water.

In order to accomplish the above object, an aspect of the present invention provides a scrubber system having an automatic oxidizing-absorbing agent generator, including: a scrubber including a pollutant gas inlet through which air pollutants are introduced, a treated gas outlet through which air pollutants having been treated is discharged, and a treated water outlet through which wastewater having been used to treat the air pollutants is discharged; and an oxidizing-absorbing agent generator for electrolyzing saline water or sea water to generate an oxidizing-absorbing agent and supplying the oxidizing-absorbing agent into the scrubber to treat the pollutant gas introduced through the pollutant gas inlet to remove harmful substances from the pollutant gas.

Here, the oxidizing-absorbing agent generator may include: a raw water supply unit for supplying saline water or sea water into the scrubber; a spray unit provided in the scrubber and spraying the saline water or sea water supplied from the raw water supply unit; an electrolysis unit provided in the scrubber and electrolyzing the saline water or sea water sprayed from the spray unit to produce a sodium hypochlorite solution; and a power supply unit for supplying power to the electrolysis unit.

Further, the plurality of electrolysis units may be provided in the scrubber such that they are vertically spaced apart from each other, and each of the electrolysis units may include a packed bed reactor provided therein with a spherical bipolar electrode.

Further, the oxidizing-absorbing agent generator may include: a diaphragm electrolyzer electrolyzing saline water or sea water to produce a sodium hypochlorite solution and having first and second electrolysis regions divided by a diaphragm; a negative electrode provided in the first electrolysis region and electrolyzing the saline water and sea water to produce alkali water; a positive electrode provided in the second electrolysis region and electrolyzing the saline water and sea water to produce acid water; a power supply unit for supplying power to the positive electrode and the negative electrode; an alkali water supply unit for supplying and spraying the alkali water produced in the first electrolysis region into the scrubber; and an acid water supply unit for supplying and spraying the acid water produced in the second electrolysis region into the scrubber.

Further, the alkali water supply unit and the acid water supply unit may be provided in the scrubber such that the alkali water and acid water are stepwisely sprayed at different heights from each other in the vertical direction of the scrubber.

Further, the scrubber system may further include an influent water supply unit for supplying influent water including sea water or general water into the scrubber, wherein the influent water supply unit may include an influent water spray unit disposed over an acid water spray unit and an alkali water spray unit, and the influent water spray unit finally treat pollutant gas.

Further, the oxidizing-absorbing agent generator may include: a diaphragmless electrolyzer for electrolyzing saline water or sea water to produce a sodium hypochlorite solution; negative and positive electrodes provided in the diaphragmless electrolyzer; a power supply unit for supplying power to the negative and positive electrodes; a sodium hypochlorite solution supply line for supplying the sodium hypochlorite solution produced from the diaphragmless electrolyzer into the scrubber; and a spray unit for spraying the sodium hypochlorite solution supplied through the sodium hypochlorite solution supply line.

Further, in the scrubber system, treated water discharged from the treated water outlet, through which wastewater having been used to treat pollutant gas in the scrubber is discharged, may recirculate into the saline water or sea water inlet of the electrolysis unit or electrolyzer of the oxidizing-absorbing agent generator.

According to the scrubber system having an automatic oxidizing-absorbing agent generator of the present invention, air pollutants introduced into a scrubber can be effectively treated (oxidized and absorbed) by supplying electrolyzed water (containing an oxidizing agent) of saline water or sea water into the scrubber using a spray method.

Particularly, the scrubber system is advantageous in that electrolyzed water is directly generated in a scrubber, and simultaneously air pollutants are oxidized and absorbed, so this scrubber system can be miniaturized and is not greatly restricted in place and space for installation.

Further, the scrubber system is advantageous in that the efficiency of absorption and oxidation of harmful substances in air pollutants can be increased by supplying and spraying both electrolyzed water and influent water (sea water or general water) into a scrubber.

Figure 1:
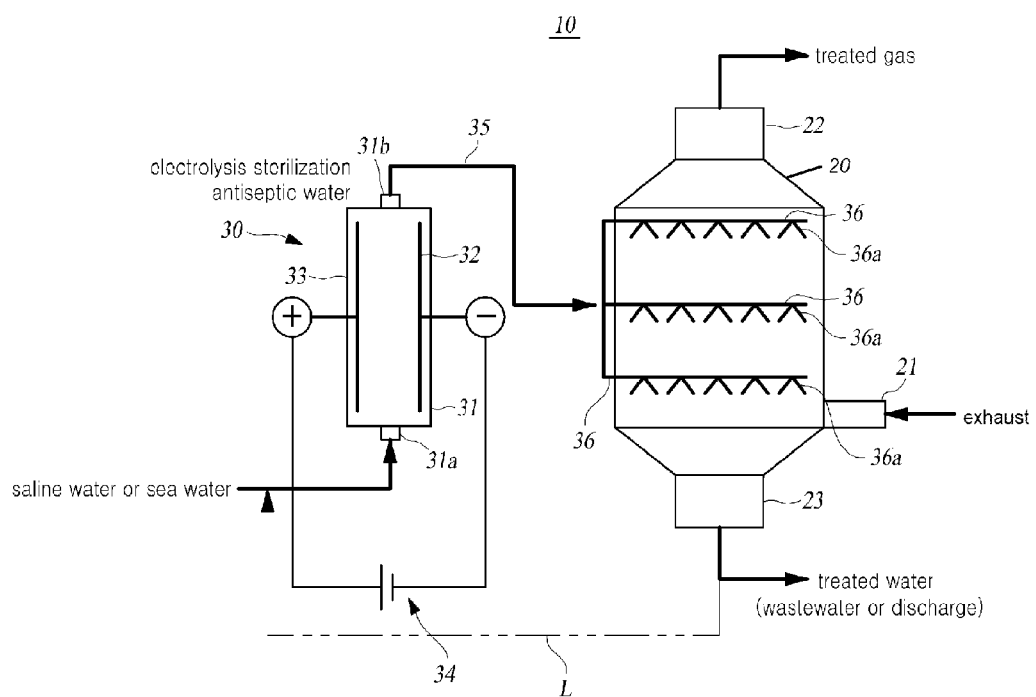
FIG. 1 is a schematic view showing a scrubber system having an automatic oxidizing-absorbing agent generator according to an embodiment of the present invention.

REFERENCE NUMERALS 10,100,200: scrubber system having automatic oxidizing-absorbing agent generator
20,20': scrubber
30,130,230: oxidizing-absorbing agent generator
31: diaphragmless electrolyzer
32,235: negative electrode
33,234: positive electrode
231: diaphragm electrolyzer.

DETAILED DESCRIPTION

Hereinafter, preferred embodiments of the present invention will be described in detail with reference to the attached drawings.

FIG. 1 is a schematic view showing a scrubber system having an automatic oxidizing-absorbing agent generator according to an embodiment of the present invention.

Referring to FIG. 1, the scrubber system 10 having an automatic oxidizing-absorbing agent generator according to an embodiment of the present invention includes a scrubber 20 and an oxidizing-absorbing agent generator 30.

The scrubber 20 includes: a pollutant gas inlet 21 through which air pollutants are introduced; a treated gas outlet 22 through which the air pollutants having been treated is discharged; and a treated water outlet 23 through which wastewater having been used to treat the air pollutants is discharged.

According to the above configuration, air pollutants are introduced into the scrubber 20 through the pollutant gas inlet 21. The introduced air pollutants are oxidized and absorbed by an oxidizing-absorbing agent supplied from the oxidizing-absorbing agent generator 30 to remove harmful substances therefrom to form treated gas, and the treated gas is transferred to the subsequent process through the treated gas outlet 22 provided at the top of the scrubber 20.

The treated water outlet 23 is provided at the bottom of the scrubber 20. The treated water having oxidized and absorbed the air pollutants is discharged through the treated water outlet 23. This treated water may be directly discharged, may be supplied to a wastewater disposal plant to pass through a subsequent process, or may be recirculated into an electrolyzer to be reused.

The oxidizing-absorbing agent generator 30 supplies the oxidizing-absorbing agent obtained by the electrolysis of saline water or sea water into the scrubber to remove nitrogen oxides and the like included in the air pollutants introduced through the pollutant gas inlet 21 by the oxidation and absorption thereof. This oxidizing-absorbing agent generator 30 includes a diaphragmless electrolyzer 31, a negative electrode 32, a positive electrode 33, a power supply unit 34, an oxidizing-absorbing agent supply line 35 and a spray unit 36.

The diaphragmless electrolyzer 31 includes: a saline water inlet 31a through which saline water or sea water (Hereinafter, referred to as "saline water") is introduced; and an oxidizing-absorbing agent outlet 31b through which the oxidizing-absorbing agent obtained by the electrolysis of saline water is discharged.

The diaphragmless electrolyzer 31 is provided therein with the negative electrode 32 and positive electrode 33, which are spaced apart from each other and face each other, and the power supply unit 34 supplies direct current to the negative electrode 32 and positive electrode 33, thereby electrolyzing saline water introduced into the diaphragmless electrolyzer 31. As such, when the saline water is electrolyzed in the diaphragmless electrolyzer 31, an oxidizing agent (NaOCl) having a pH of 8~11 (weak alkalinity) is generated, and an absorbing agent (electrolyzed water) containing this oxidizing agent is supplied to the spray unit 36 provided in the scrubber 20 through the oxidizing-absorbing agent supply line 35.

The spray unit 36 includes a plurality of spray nozzles 36a, and these spray nozzles 36a may be arranged in a multi-stage form. That is, the spray nozzles 36a are vertically arranged at regular intervals in a multi-stage form from the pollutant gas inlet 21 to the treated gas outlet 22, so air pollutants are stepwisely treated, and thus the harmful substances (nitrogen oxides and the like) included in the air pollutants are effectively oxidized and absorbed, thereby more effectively removing these harmful substances.

As described above, the scrubber system having an automatic oxidizing-absorbing agent generator according to an embodiment of the present invention is configured such that saline water is electrolyzed by a simple process to produce an oxidizing agent (NaOCl), and an oxidizing-absorbing agent including the oxidizing agent is supplied into the scrubber 20 and sprayed, thereby more effectively removing the harmful substances included in the air pollutants introduced into the scrubber 20. Particularly, this scrubber system is advantageous in that its structure can be simplified, its size can be reduced, and its weight can be reduced, thus reducing installation cost, and in that it can be easily installed even in a space-restricted place such as a ship or the like.

Meanwhile, since a process (reaction) of treating air pollutants by oxidizing and absorbing harmful substances included in the air pollutants using an oxidizing agent (NaOCl) is commonly known to those skilled in the art, a detailed description thereof will be omitted.

Figure 2:
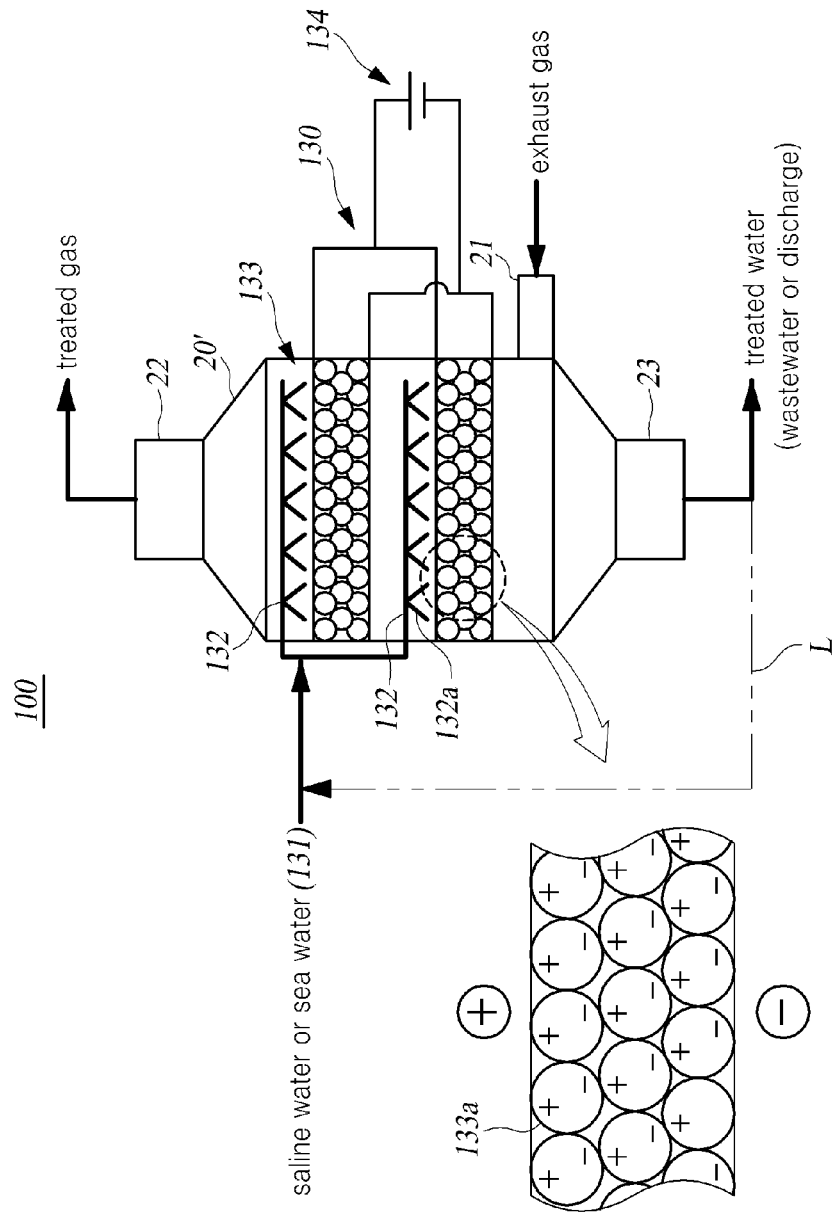
FIG. 2 is a schematic view showing a scrubber system having an automatic oxidizing-absorbing agent generator according to another embodiment of the present invention.

FIG. 2 shows a scrubber system 100 according to another embodiment of the present invention. Referring to FIG. 2, the scrubber system 100 includes a scrubber 20' and an oxidizing-absorbing agent generator 130.

The scrubber 20' has the same structure as the scrubber 20 shown in FIG. 1. That is, the scrubber 20' includes a pollutant gas inlet 21, a treated gas outlet 22 and a treated water outlet 23.

The oxidizing-absorbing agent generator 130 includes a raw water supply unit 131, a spray unit 132, an electrolysis unit 133 and a power supply unit 134.

The raw water supply unit 131 serves to supply saline water to the scrubber 20', and may include a raw water tank (not shown) and a pump (not shown). The raw water, that is, saline water, supplied from the raw water supply unit 131, is uniformly sprayed downward in the scrubber 20' through the spray unit 132.

More specifically, a plurality of the spray units 132 are vertically spaced apart from each other such that they uniformly spray saline water to each of the vertically-provided electrolysis units 133. Each of the spray units 132 is provided with a plurality of spray nozzles 132a. Therefore, saline water sprayed from the spray units 132 is uniformly supplied to the electrolysis units 133, and thus an oxidizing agent (NaOCl) having a pH of 8~11 (weak alkalinity) is generated by the electrolysis reaction of saline water in the electrolysis units 133. Since this oxidizing agent (NaOCl) generated in this way functions to increase the oxidation rate and absorption rate of air pollutants, harmful substances included in air pollutants are oxidized and absorbed in a liquid state, thus more effectively treating the air pollutants.

Meanwhile, the electrolysis units 133 are provided in the scrubber 20', and serve to electrolyze the sprayed saline water using the direct current applied from the power supply unit 134 to generate a sodium hypochlorite solution, that is, an oxidizing agent (NaOCl). These electrolysis units are provided in a multi-stage form such that they are vertically spaced from each other along the moving route of air pollutants. This electrolysis unit may include a packed bed reactor provided therein with spherical bipolar electrodes 133a. As such, when direct current is applied to the electrolysis unit 133, a sodium hypochlorite solution is generated by the electrolysis reaction of saline water, and this sodium hypochlorite solution oxidizes and absorbs harmful substances included in air pollutants to remove the air pollutants. As such, in order to perform both the electrolysis of saline water and the oxidation and absorption of harmful substances in the electrolysis unit 133, the electrolysis unit 133 may be configured such that the gas moving route in the scrubber 20' is blocked in predetermined thickness and a plurality of electrolysis units 133 are provided in a multi-stage form.

As shown in FIG. 2, when the electrolysis unit 133 is provided in the scrubber 20', there is an advantage in that the scrubber system can be small and light because installation space can be reduced. Further, there is an advantage in that an electrolyzer is not additionally needed, so the number of constituents can be reduced, thereby reducing a cost.

Figure 3:
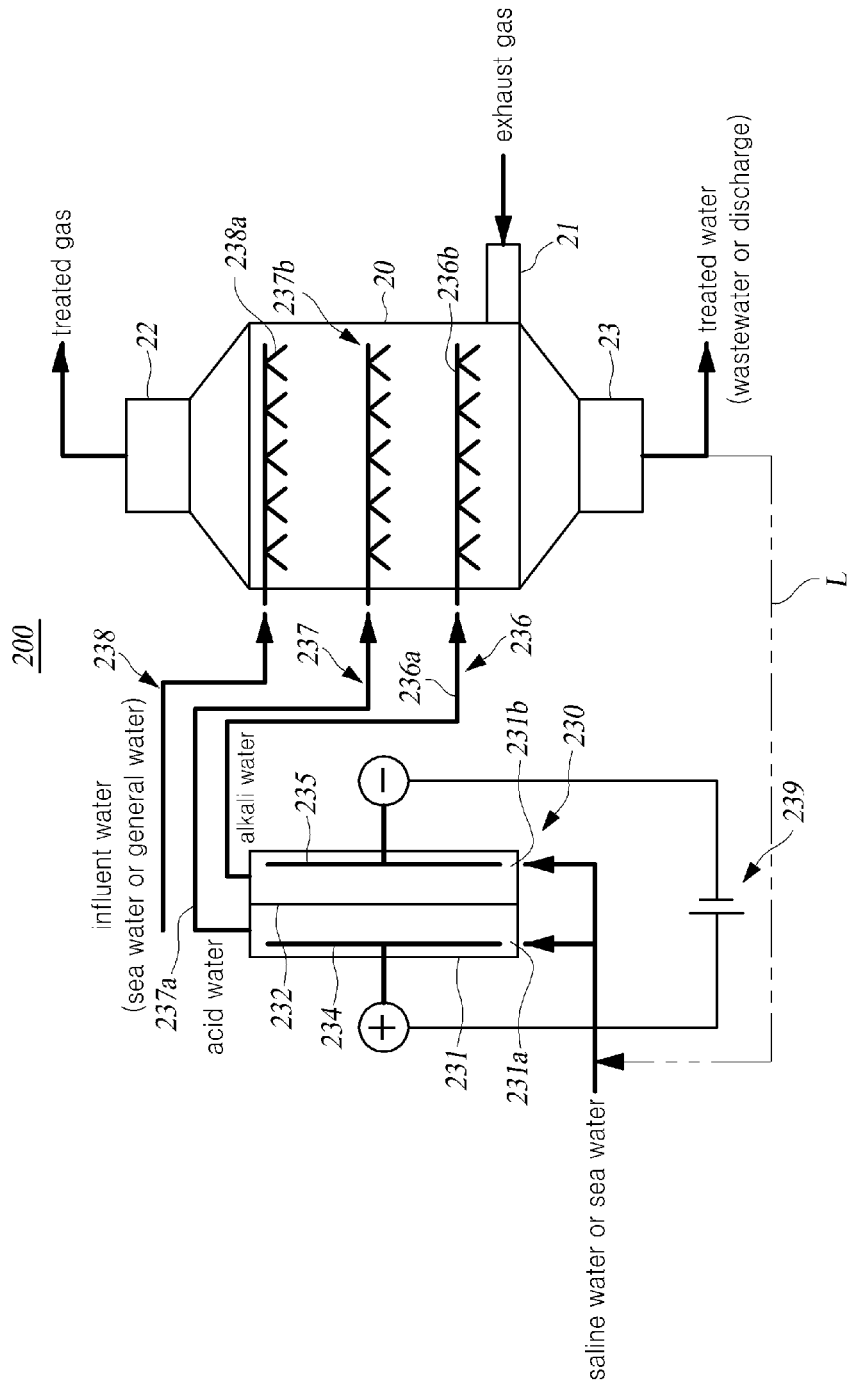
FIG. 3 is a schematic view showing a scrubber system having an automatic oxidizing-absorbing agent generator according to a still another embodiment of the present invention.

FIG. 3 shows a scrubber system 200 according to still another embodiment of the present invention. Referring to FIG. 3, the scrubber system 200 includes a scrubber 20 and an oxidizing-absorbing agent generator 230.

Since the scrubber 20 is the same structure as the scrubber shown in FIG. 1, the same reference numeral 20 is given. Therefore, a detailed description thereof will be omitted.

The oxidizing-absorbing agent generator 230 includes a diaphragm electrolyzer 231, a positive electrode 234, a negative electrode 235, a power supply unit 239, an alkali water supply unit 236, an acid water supply unit 237 and an influent water supply unit 238.

The diaphragm electrolyzer 231 is provided therein with a diaphragm for dividing the inside thereof into a first electrolysis region 231a and a second electrolysis region 231b. Saline water is introduced into each of the electrolysis regions 231a and 231b, and the introduced saline water is electrolyzed by each of the negative electrode 235 and positive electrode 234 respectively provided in the electrolysis regions 231a and 231b.

When the power supply unit 239 supplies direct current to the positive electrode 234 and the negative electrode 235, the electrolysis of saline water takes place in each of the electrolysis regions 231a and 231b, and thus electrolyzed water is produced.

Specifically, in the first electrolysis region 231a, saline water is electrolyzed by the positive electrode 234 to produce acid water containing an oxidizing agent (Cl2), and, in the second electrolysis region 231b, saline water is electrolyzed by the negative electrode 235 to produce alkali water containing caustic soda (NaOH).

The alkali water supply unit 236 includes: an alkali water supply line 236a for supplying alkali water to the scrubber 20 from an electrolyzed water outlet of the second electrolysis region 231b; and an alkali water spray unit 236b for spraying the alkali water supplied through the alkali water supply line 236a into the scrubber 20.

The acid water supply unit 237 includes: an acid water supply line 237a for supplying acid water to the scrubber 20 from an electrolyzed water outlet of the first electrolysis region 231a; and an acid water spray unit 237b for spraying the acid water supplied through the acid water supply line 237a into the scrubber 20.

Meanwhile, it is shown in FIG. 3 that the acid water spray unit 237b is disposed over the alkali water spray unit 236b. However, the positions thereof may be changed with each other.

Further, the influent water supply unit 238 serves to directly supply saline water or sea water, as non-electrolyzed water, into the scrubber, and the scrubber is provided therein with an influent water spray unit 238a for spraying influent water. The influent water spray unit 238a is disposed over the acid water spray unit 237b and the alkali water spray unit 236b, that is, is disposed downstream based on the moving route of pollutant gas. Therefore, pollutant gas introduced through the pollutant gas inlet 21 may be primarily treated with alkali water, secondarily treated with acid water, and then finally treated with influent water (general water), or may be primarily treated with acid water, secondarily treated with alkali water, and then finally treated with influent water (general water) to effectively oxidize and absorb harmful substances included in pollutant gas, thereby removing the pollutant gas.

As described above, the scrubber system 200 having an oxidizing-absorbing agent generator according to still another embodiment of the present invention is advantageous in that saline water or sea water is electrolyzed using the diaphragm electrolyzer 231 to separately produce alkali water and acid water containing an oxidizing agent, and the alkali water and acid water are each independently supplied into the scrubber 20, thus stepwisely oxidizing and absorbing harmful substances included in pollutant gas to remove the pollutant gas.

Further, referring to FIGS. 1 to 3, in the scrubber systems 10, 100 and 200, treated water discharged from the treated water outlet 23, through which wastewater having been used to treat pollutant gas in each of the scrubbers 20 and 20' is discharged, recirculates into each of the inlets 31a, 131, 231a and 231b for supplying saline water or sea water of the electrolysis unit 133 or each of the electrolyzers 31 and 231 of each of the oxidizing-absorbing agent generators 30, 130 and 230 to form a branch line (L), thereby enabling the reuse of the treated water.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A scrubber system having an automatic oxidizing-absorbing agent generator, comprising:
a scrubber including a pollutant gas inlet through which air pollutants are introduced, a treated gas outlet through which air pollutants having been treated are discharged, and a treated water outlet through which wastewater having been used to treat the air pollutants is discharged; and
an oxidizing-absorbing agent generator for electrolyzing saline water or sea water to generate an oxidizing-absorbing agent and supplying the oxidizing-absorbing agent into the scrubber to treat a pollutant gas introduced through the pollutant gas inlet to remove harmful substances from the pollutant gas,
wherein the oxidizing-absorbing agent generator comprises: a raw water supply unit for supplying saline water or sea water into the scrubber; a spray unit provided in the scrubber and spraying the saline water or sea water supplied from the raw water supply unit; an electrolysis unit provided in the scrubber and electrolyzing the saline water or sea water sprayed from the spray unit to produce a sodium hypochlorite solution; and a power supply unit for supplying power to the electrolysis unit, and
wherein a plurality of the electrolysis units are provided in the scrubber such that the plurality of the electrolysis units are vertically spaced apart from each other, and each of the electrolysis units includes a packed bed reactor provided therein with a spherical bipolar electrode.

2. The scrubber system of claim 1, wherein the oxidizing-absorbing agent generator comprises:
a diaphragmless electrolyzer for electrolyzing saline water or sea water to produce a sodium hypochlorite solution; negative and positive electrodes provided in the diaphragmless electrolyzer;
a power supply unit for supplying power to the negative and positive electrodes; a sodium hypochlorite solution supply line for supplying the sodium hypochlorite solution produced from the diaphragmless electrolyzer into the scrubber; and
a spray unit for spraying the sodium hypochlorite solution supplied through the sodium hypochlorite solution supply line.

3. The scrubber system of claim 1, wherein treated water discharged from the treated water outlet, through which wastewater having been used to treat pollutant gas in the scrubber is discharged, recirculates into a saline water or sea water inlet of the plurality of electrolysis units or electrolyzer of the oxidizing-absorbing agent generator.

4. The scrubber system of claim 1, wherein the oxidizing-absorbing agent generator comprises:
a diaphragm electrolyzer electrolyzing saline water or sea water to produce a sodium hypochlorite solution and having first and second electrolysis regions divided by a diaphragm;
a negative electrode provided in the first electrolysis region and electrolyzing the saline water or sea water to produce alkali water;
a positive electrode provided in the second electrolysis region and electrolyzing the saline water or sea water to produce acid water;
a power supply unit for supplying power to the positive electrode and the negative electrode; an alkali water supply unit for supplying and spraying the alkali water produced in the first electrolysis region into the scrubber; and
an acid water supply unit for supplying and spraying the acid water produced in the second electrolysis region into the scrubber.

5. The scrubber system of claim 4, wherein the alkali water supply unit and the acid water supply unit are provided in the scrubber such that the alkali water and acid water are stepwisely sprayed at different heights from each other in a vertical direction of the scrubber.

6. The scrubber system of claims 4 or 5, further comprising an influent water supply unit for supplying influent water including sea water or general water into the scrubber, wherein the influent water supply unit includes an influent water spray unit disposed over an acid water spray unit and an alkali water spray unit, and the influent water spray unit finally treats pollutant gas.

* * * * *